(12) United States Patent
Enghard

(10) Patent No.: US 10,588,463 B2
(45) Date of Patent: Mar. 17, 2020

(54) MIXING CONTAINER

(71) Applicant: Florian Enghard, Frankfurt am Main (DE)

(72) Inventor: Florian Enghard, Frankfurt am Main (DE)

(*) Notice: Subject to any disclaimer, the term of this patent is extended or adjusted under 35 U.S.C. 154(b) by 424 days.

(21) Appl. No.: 14/901,786

(22) PCT Filed: Jul. 2, 2014

(86) PCT No.: PCT/EP2014/001808
§ 371 (c)(1),
(2) Date: Dec. 19, 2016

(87) PCT Pub. No.: WO2015/000589
PCT Pub. Date: Jan. 8, 2015

(65) Prior Publication Data
US 2017/0105581 A1    Apr. 20, 2017

(30) Foreign Application Priority Data

Jul. 2, 2013 (DE) .................. 10 2013 011 000
Sep. 26, 2013 (DE) .................. 10 2013 015 990
Oct. 18, 2013 (DE) .................. 10 2013 017 310

(51) Int. Cl.
A47J 43/27 (2006.01)
A47G 19/22 (2006.01)
(Continued)

(52) U.S. Cl.
CPC .......... *A47J 43/27* (2013.01); *A47G 19/2272* (2013.01); *B01F 13/0022* (2013.01);
(Continued)

(58) Field of Classification Search
CPC .................................................. A47J 43/27
(Continued)

(56) References Cited

U.S. PATENT DOCUMENTS 58,165 A    9/1866 Drennan
302,484 A    7/1884 Haslage
(Continued)

FOREIGN PATENT DOCUMENTS

DE    102008055787    5/2010
DE    202013001192    5/2013
(Continued)

OTHER PUBLICATIONS

International Search Report of the International Searching Authority for International Application PCT/EP2014/001808, dated Sep. 10, 2014, 2 pages, European Patent Office, HV Rijswijk, Netherlands.
(Continued)

Primary Examiner — David L Sorkin
(74) Attorney, Agent, or Firm — Amna Kinney; Michael Ferrell

(57) ABSTRACT

The invention relates to a mixing container, which includes an internally cylindrical container (1) with a lid element (2) that is closeable at the top, and an internally axially movably arranged mixing element (3). In that regard, the invention is characterized in that the mixing element (3) includes at least two snail-shaped spiral parts (4, 5) with at least one screw-shaped spiral part (6) arranged axially therebetween, which consists of at least one one-piece wire coil (20), and, by its snail-shaped (4, 5) and/or screw-shaped spiral parts (6), is adapted externally to the inner diameter of the container (1) while maintaining a small sliding gap (7), wherein the mixing element (3) comprises an axial length of at least ¼ to at most ⅔ of the container interior space (8).

6 Claims, 4 Drawing Sheets

Figure 1:
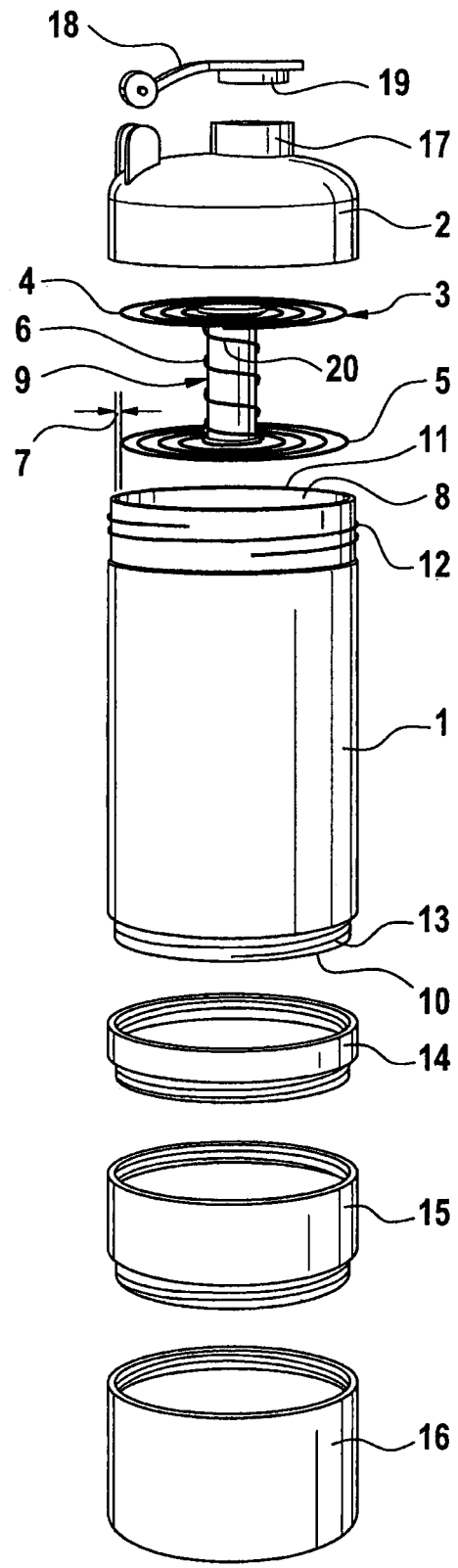

(51) Int. Cl.
- *B01F 13/00* (2006.01)
- *B01F 15/00* (2006.01)
- *B65D 41/04* (2006.01)
- *B65D 47/08* (2006.01)

(52) U.S. Cl.
CPC .... *B01F 13/0055* (2013.01); *B01F 15/00058* (2013.01); *B65D 41/04* (2013.01); *B65D 47/0857* (2013.01)

(58) Field of Classification Search
USPC .......................................................... 366/130
See application file for complete search history.

(56) References Cited

U.S. PATENT DOCUMENTS

| | | |
|---|---|---|
| 370,861 A | 10/1887 | Drum |
| 395,303 A | 12/1888 | Wuchner |
| 572,581 A | 12/1896 | Staples |
| 915,577 A | 3/1909 | Parmer |
| 1,042,964 A | 10/1912 | Prater |
| 1,060,419 A | 4/1913 | Benjamin |
| 1,116,988 A | 11/1914 | Burke |
| 1,208,862 A | 12/1916 | Velissarides |
| 1,649,874 A | 11/1927 | Taylor |
| 1,963,055 A | 6/1934 | Powers |
| 1,967,469 A | 7/1934 | Dulany |
| 2,040,648 A | 5/1936 | Fortes |
| D140,707 S | 4/1945 | Gibson |
| 2,382,222 A | 8/1945 | Havas |
| 2,400,209 A | 5/1946 | Peters |
| 2,520,818 A | 8/1950 | Terry |
| 2,577,373 A | 12/1951 | Smith |
| 2,580,132 A | 12/1951 | Seymour |
| 2,776,120 A | 1/1957 | Terrett |
| 2,793,012 A | 5/1957 | Wolf |
| 2,922,628 A | 1/1960 | Koe |
| 3,116,770 A | 1/1964 | Tanuma |
| 3,136,532 A | 6/1964 | Rudnick |
| 3,820,692 A | 6/1974 | Swett et al. |
| D234,769 S | 4/1975 | Rosenberg |
| 4,003,555 A | 1/1977 | Swartz |
| 4,040,549 A | 8/1977 | Sadler |
| 4,111,407 A | 9/1978 | Stager |
| 4,538,922 A | 9/1985 | Johnson |
| 4,575,255 A | 3/1986 | Kafka |
| 4,637,941 A | 1/1987 | Rochte |
| 4,696,418 A | 9/1987 | Kurotaka et al. |
| 4,737,036 A | 4/1988 | Offermann |
| 4,818,114 A | 4/1989 | Ghavi |
| 4,916,672 A | 4/1990 | McCrory |
| D331,150 S | 11/1992 | Hartel |
| D336,188 S | 6/1993 | Barber et al. |
| 5,228,521 A | 7/1993 | Sing |
| 5,235,389 A | 8/1993 | Kikuchi et al. |
| 5,336,536 A | 8/1994 | Oberzan |
| D362,793 S | 10/1995 | Khan et al. |
| D367,998 S | 3/1996 | Graw et al. |
| 5,531,353 A | 7/1996 | Ward et al. |
| D372,624 S | 8/1996 | Chein |
| 5,547,275 A | 8/1996 | Lillelund et al. |
| D375,229 S | 11/1996 | DiBella |
| D391,844 S | 3/1998 | Ropponen et al. |
| D393,782 S | 4/1998 | Langford |
| 5,788,369 A | 8/1998 | Tseng |
| D404,072 S | 1/1999 | Ford et al. |
| D404,074 S | 1/1999 | Sarriugarte et al. |
| 5,878,998 A | 3/1999 | Hsieh |
| 6,048,590 A | 4/2000 | Phillips |
| 6,095,033 A | 8/2000 | Melton |
| D432,453 S | 10/2000 | Franzen |
| 6,135,017 A | 10/2000 | Wang et al. |
| 6,332,704 B1 | 12/2001 | Gasser et al. |
| 6,379,032 B1 | 4/2002 | Sorensen |
| 6,409,038 B1 | 6/2002 | Karp |
| 6,419,898 B1 | 7/2002 | Flashinski et al. |
| 6,600,255 B1 | 7/2003 | Kai et al. |
| 6,609,820 B2 | 8/2003 | Litwiller |
| D479,956 S | 9/2003 | Bellander |
| D487,862 S | 3/2004 | Tincher |
| D488,339 S | 4/2004 | Lee |
| D496,768 S | 9/2004 | Izumoto |
| D498,701 S | 11/2004 | Libuda et al. |
| D498,966 S | 11/2004 | Fiedeler et al. |
| D502,223 S | 2/2005 | Kaplan et al. |
| 6,913,165 B2 | 7/2005 | Linz et al. |
| 6,922,943 B1 | 8/2005 | Paille et al. |
| D513,916 S | 1/2006 | Namee |
| 7,089,878 B2 | 8/2006 | Huang |
| D527,959 S | 9/2006 | Fung |
| D533,107 S | 12/2006 | King |
| D541,601 S | 5/2007 | Fung |
| D542,102 S | 5/2007 | Cheung |
| 7,225,920 B2 | 6/2007 | Hoeffkes et al. |
| 7,354,225 B1 | 4/2008 | Cohen |
| D568,203 S | 5/2008 | Lindberg |
| 7,387,283 B2 | 6/2008 | Franczyk |
| 7,441,941 B2 | 10/2008 | Vernon |
| 7,445,823 B2 | 11/2008 | Tennison |
| D582,223 S | 12/2008 | Vendl et al. |
| D585,708 S | 2/2009 | Gransbury |
| D587,643 S | 3/2009 | Slagel |
| D589,873 S | 4/2009 | Banks |
| D594,593 S | 6/2009 | Ohmori et al. |
| 7,571,830 B2 | 8/2009 | Lin |
| D613,559 S | 4/2010 | Goodman et al. |
| D620,752 S | 8/2010 | Daniels et al. |
| D632,908 S | 2/2011 | Tincher |
| D646,919 S | 10/2011 | Nilsson |
| D647,366 S | 10/2011 | Enghard |
| D649,709 S | 11/2011 | Loman |
| D650,225 S | 12/2011 | Bartol et al. |
| D657,159 S | 4/2012 | Rosaen |
| D664,392 S | 7/2012 | Enghard |
| D683,910 S | 6/2013 | Muhr et al. |
| D700,006 S | 2/2014 | Ehrenhaus |
| D700,807 S | 3/2014 | Kershaw et al. |
| D705,499 S | 5/2014 | Zamarripa |
| D723,325 S | 3/2015 | Enghard |
| D725,431 S | 3/2015 | Enghard |
| D736,559 S | 8/2015 | Enghard |
| 2001/0025825 A1 | 10/2001 | Therber |
| 2003/0002385 A1 | 1/2003 | Pola et al. |
| 2008/0259723 A1 | 10/2008 | Rhodes et al. |
| 2011/0210132 A1 | 9/2011 | Enghard |
| 2012/0061398 A1 | 3/2012 | Nilsson |
| 2013/0305993 A1 | 11/2013 | Lush |
| 2014/0119154 A1* | 5/2014 | Kershaw ............ B01F 13/0022 366/130 |

FOREIGN PATENT DOCUMENTS

| | | |
|---|---|---|
| EP | 2 341 807 | 1/2013 |
| GB | 10287 | 3/1895 |
| GB | 327 661 | 4/1930 |
| GB | 441 515 | 1/1936 |
| GB | 2 442 593 | 2/2009 |
| GB | 2 454 759 | 5/2009 |
| JP | 2006-182426 | 7/2006 |
| WO | WO 2012/096990 | 7/2012 |

OTHER PUBLICATIONS

PCT International Preliminary Report on Patentability including English Translation of PCT Written Opinion of the International Searching Authority for International Application PCT/EP2014/001808, dated Jan. 5, 2016, 6 pages, International Bureau of WIPO, Geneva, Switzerland.
http://blenderbottle.com/ Apr. 1, 2001.
http://blenderbottle.com/ May 4, 2002.
http://www.blenderbottle.com/blenderbottle-prostak.html?landing=true, earliest Publication Date unknown, Accessed on Oct. 9, 2013.

(56) References Cited

OTHER PUBLICATIONS http://www.amazon.com/SKILLFIT-ShakeBlender-Stainless-Shaker-PowerMix/dp/B00COE1BE4/ref=pd sim k 2, "SKILLFIT ShakeBlender Stainless Steel Shaker Bottle with PowerMix Mixing Spring", Amazon, First Publication Date unknown, Accessed on Sep. 19, 2013, 3 pages.

http://suns-teas.amazonwebstore.com/Suns-Tea-TM-21oz-Borosilicate-Glass/M/B000cb . . . , "Sun's Tea (TM) 21oz Borosilicate Glass Blender Bottle with hourglass-shape Blending Spring", Amazon, First Publication Date unknown, Accessed on Sep. 19, 2013, 2 pages.

\* cited by examiner

MIXING CONTAINER

The invention relates to a mixing container according to the preamble of the patent claim 1.

At this time, a great number of shakers, mixing cups and drinking bottles are known, which are provided for the mixing of various different substances. In that regard, mostly powders as nutritional supplements and a liquid are used for the mixing, and are often provided for improving the athletic performance ability. These shakers, mixing cups or drinking bottles are to enable or improve a good mixing of the powder-form nutritional supplements with the liquid. For that purpose, the substances to be mixed are filled into a mixing container and closed with a lid element. Through a mixing motion that is preferably carried out by hand, the substances are mixed with one another in the mixing container to form a dispersive liquid, which is suitable for immediate drinking. Such mixing containers can, however, also be provided for other mixing processes.

Such a mixing apparatus is known from the U.S. Pat. No. 2,776,120 A, which is provided preferably for the mixing of milk powder and water. This mixing apparatus includes a cylindrical container that is closeable by a flat lid. An inwardly oriented mixing apparatus is fixed on the lid preferably by a suction cup. The mixing apparatus consists of a screw-shaped wire coil of which the diameter fills out approximately ½ to ⅔ of the inner diameter of the cylindrical container. At the bottom end of the screw-shaped wire coil, it is formed into a flat snail spiral, which ends toward the center in a circular opening. In that regard, the wire coil consists of a spring-elastic material, which in the resting state is arranged below the lid and preferably fills out ⅕ of the axial height of the cylindrical container, in that the screw-shaped wire coils lie tightly against one another. For mixing the milk powder with the water liquid, it is first filled into the cylindrical container and closed by the lid with the mixing apparatus. For mixing, the container is shaken preferably by hand so that the spiral, due to its own self-weight and its elasticity, moves into an axially extended position down to the bottom of the container and thereafter again swings or oscillates back and thereby mixes the milk powder with the water. Even though the spiral moves through the entire length of the container, powder clumps can be adhered onto the walls or the bottom floor, which are not reachable by the spiral and thus are not completely mixed with the water.

From the U.S. Pat. No. 6,379,032 B1, a mixing or stirring mechanism is known, which is similarly provided for mixing a powder into a liquid. In that regard, the mixing or stirring mechanism is inserted into a cylindrical container, which is closeable by a screwable lid. In that regard, the mixing or stirring mechanism encompasses a wire frame element, which is embodied in a defined shape, preferably as a sphere, which leaves interspaces on the surface through which the liquid together with the powder can flow into and out of the hollow space of the wire frame element. In the hollow space of this wire frame element, additionally a smaller inner mixing or stirring mechanism is provided, which can move back and forth in the hollow space of the wire frame element and thereby effectuate an additional turbulence or vorticity in the mixing process. In that regard, an embodiment of a mixing apparatus is provided, in which the wire frame element is wound with a single wire to form a sphere-shaped object as a spiral-shaped mixing element. In addition to that, as the inner mixing or stirring mechanism, preferably a similarly spiral-shaped wound sphere-shaped object with a smaller diameter is provided, which is located in the interior hollow space of the wire frame element. For mixing the liquid with the powder, this is filled through the opened lid into the interior space of the mixing container, in which at least one mixing or stirring mechanism with its inner mixing or stirring mechanism is located. After closing the lid, the container is preferably shaken by hand, whereby the mixing or stirring mechanism moves back and forth within the container due to its own self-weight. Thereby the liquid will stream or flow in and out of the interior space of the wire element at least through the interspaces of the wire frame element, and additionally will be turbulated by the inner mixing or steering element. Even if the ball-like stirring mechanisms can strike against nearly all interior wall parts of the container by the shaking process, a relatively long mixing process is necessary to move through the entire interior space of the container up to its interior walls, in order to surely effectuate a uniform mixing of the powder with the liquid.

From the EP 2 341 807 B1, a drinking container is known, in the interior space of which a mixing apparatus is arranged on the container opening. In that regard, the mixing apparatus consists of a wire element that is embodied as a flat elastic spiral and that is movable in a freely swinging or oscillating manner in the axial direction in the container interior space due to its own self-weight. For mixing a liquid with a powder, both of these are filled into the interior space of the drinking container, and then the mixing apparatus is clamped-in on the upper rim of the drinking container and the container opening is closed by a lid element. If the drinking container is now shaken by hand, then the flat elastic spiral submerges from the top axially into the container interior space down to the bottom floor area and thereby mixes the powder with the liquid. In that regard, especially in the upper area of the drinking container, it can occur that powder clumps adhere there onto the inner walls, whereby these powder clumps are only reachable with difficulty by the spiral that is fixed at the top, and then require a timewise longer mixing process.

Therefore, the underlying object of the invention is to improve the mixing containers of the above described type so that the substances to be mixed together can be uniformly and quickly mixed with the liquid, and so that to the extent possible no powder-form substances can adhere onto the container interior walls over a longer mixing time period.

This object is achieved by the invention set forth in patent claim 1. Further developments and advantageous example embodiments of the invention are set forth in the dependent claims.

The invention has the advantage that through the at least two snail-shaped (coiled) spiral parts, nearly the entire interior diameter of the cylinder interior space is filled out, and thereby these two snail-shaped spiral parts function like a sieve, and any arising clumps in the liquid are dissolved after only one up and down motion. Thereby simultaneously, any arising adhesions on the interior side walls are scraped or carried away and advantageously mixed with the liquid by the outer diameter of the two snail-shaped (coiled) and/or screw-shaped (helical) spiral parts adapted to the inner diameter of the cylinder interior space.

The invention furthermore has the advantage that through the at least two snail-shaped spiral parts and the screw-shaped spiral part arranged therebetween, at least the two spiral parts adapted to the container inner diameter are arranged spaced-apart and thus effectuate a guidance within the container. Thereby, due to its own self-weight and an external shaking process, the mixing element moves slidingly through the entire axial container length and therewith sieves through the entire container interior space and thereby distributes the substances to be mixed very uniformly in the liquid. Thereby, with a short-duration shaking of the mixing container, for example powder-form nutritional supplements can thusly be dissolved or mixed in a liquid so that thereby a dispersive drinking liquid is quickly producible.

The invention simultaneously has the advantage that due to the two snail-shaped and screw-shaped spiral parts, in a simple manner a one-piece mixing element is producible, which can be carried out by a one-time winding process by means of a metal wire. Such mixing elements of a wound wire are advantageously also easily insertable into the mixing container after the filling process, or to be removed after the emptying, and thereby to be supplied to an automatic cleaning in a simple manner. Such mixing elements of a metal wire simultaneously have the advantage that they can be produced both rigid as well as spring-elastic. In that regard especially spring-elastic mixing elements have the advantage that powder clumps or adhesions that adhere thereon are easily released from the wire by a spring-elastic shape-change during the shaking process.

The invention of the mixing container with the mixing element adapted to the diameter of the interior space simultaneously has the advantage that the cylindrical container can also be embodied as a drinking bottle, of which the lid simultaneously comprises a closeable drinking spout, so that the liquid that is briefly mixed with a nutritional supplement is immediately drinkable, without a transferring or decanting or pouring-over process of the mixed drinking liquid being necessary.

The invention of the mixing container according to patent claim 6 with the mixing element without the screw-shaped spiral parts has the advantage that it is easily producible and that thereby in a simple manner the central passage in the snail-shaped spiral parts is closeable so that thereby the sieve function is improved. In that regard, three or more snail-shaped spiral parts can also be fixed on such a hollow body in a simple manner so that thereby simultaneously the guidance in the cylindrical container is improved and the sieve function is multiplied, whereby a high mixing effectiveness is achievable through only a few shaking processes.

In a particular embodiment of the invention it is additionally provided that a hollow body is fixed within the screw-shaped spiral part. This additionally has the advantage that thereby the central opening in the mixing element is closeable, through which the sieve function of the mixing element is improved. Simultaneously, cooling agents can be introduced in this hollow body, by which a drinking liquid can be cooled during the mixing process. Moreover, portable pH-sticks can be arranged in this hollow body, by which the liquid can be brought into a desired pH-state, whereby the hollow space of the hollow body is made accessible through opening slits or opening bore-holes. Furthermore, soluble medicinal supplements can be introduced into the hollow body, which shall be ingested simultaneously with the liquid. Advantageously it is also conceivable to introduce additional weight elements into the hollow body, by which the mixing of the drinking liquid is adaptable to the viscosity of the substances to be mixed and can thereby be shortened.

In a further particular embodiment of the invention it is additionally provided to secure one or more screw-mountable auxiliary containers on the lower part of the mixing container. This has the advantage that the admixable substances can be stored therein during mobile activities, and as needed can be filled into the drinking container in the simplest manner.

Figure 2:
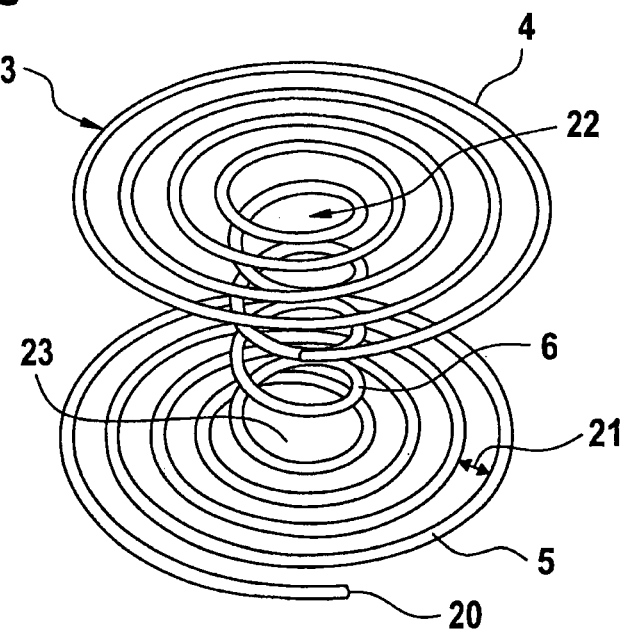
Figure 3:
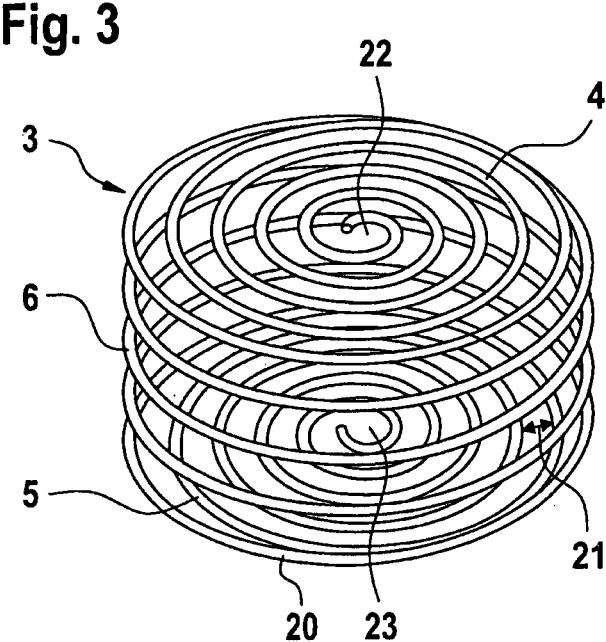
Figure 5:
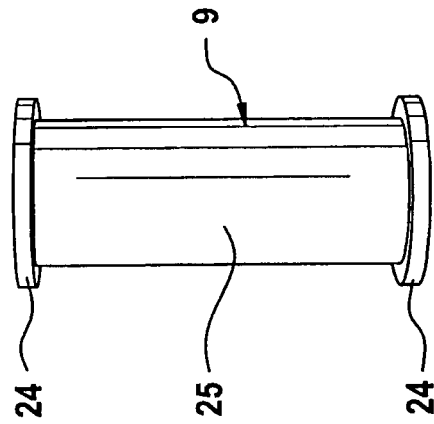
Figure 4:
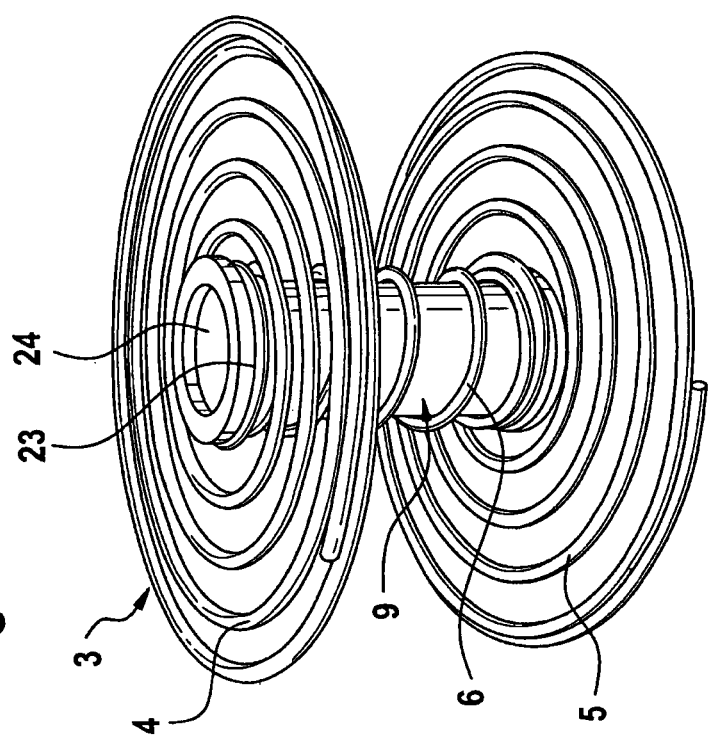

The invention will be described in further detail in connection with an example embodiment, which is illustrated in the drawing. It is shown by:

FIG. 1: an exploded view of a mixing bottle with a drinking closure, a mixing element, a drinking container, as well as three auxiliary containers;

FIG. 2: a mixing element with a central inner screw-shaped spiral part;

FIG. 3: a mixing element with a coaxial outer screw-shaped spiral part;

FIG. 4: a mixing element with a central hollow body fixed in the central inner screw-shaped spiral part;

FIG. 5: a hollow body of plastic material, and

Figure 6:
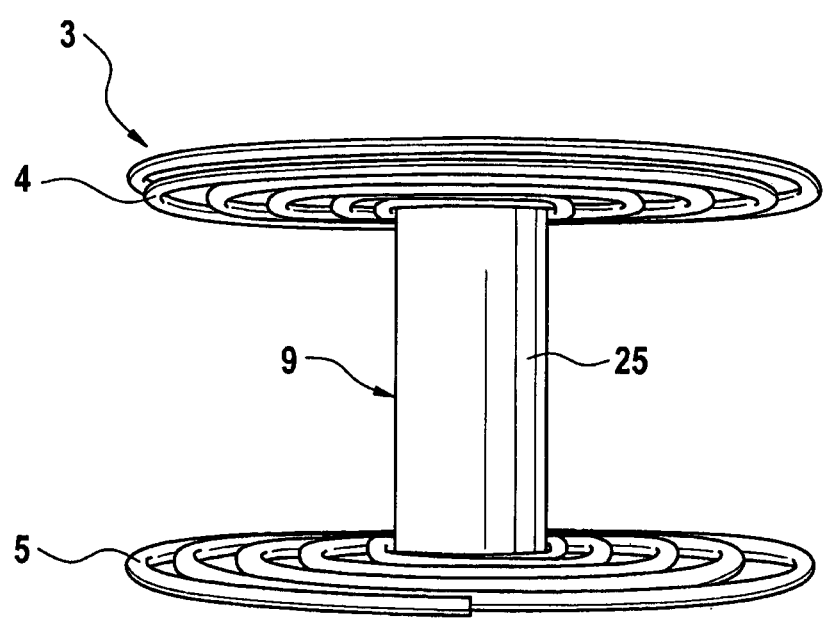

FIG. 6: a mixing element with two snail-shaped spiral parts and a central hollow body arranged therebetween.

In FIG. 1 of the drawing, a mixing container is illustrated, which is embodied as a mixing bottle with a cylindrical container part 1 in which a mixing element 3 that is adapted to its internal diameter is axially movably arranged. The mixing element 3 comprises two axially spaced-apart snail-shaped (coiled) spiral parts 4, 5, and between those a screw-shaped (helical) spiral part 6 with smaller diameter is centrally arranged, whereby a hollow body 9 of plastic material is fixed in the screw-shaped spiral part 6, and the drinking container is closeable by a lid-shaped drinking closure 2 as a lid element.

The drinking container consists of a cylindrical container part 1 that comprises a uniform or constant inner diameter and is closed at the bottom by a base surface 10. A first external thread 12 is arranged on the upper container opening 11, and is closeable with a lid element 2 with an internal thread. The drinking container 1 is preferably produced of synthetic plastic material, but can also be fabricated of metal or glass. Furthermore, the drinking container 1, on its bottom base surface 10, includes a second external thread 13, onto which preferably auxiliary containers 14, 15, 16 are screwable.

In the illustrated embodiment, the drinking container 1 includes preferably three auxiliary containers 14, 15, 16, which comprise at least one internal thread, with which they can be connected with the drinking container 1 or a further auxiliary container 14, 15, 16. These auxiliary containers 14, 15, 16 are similarly preferably embodied of synthetic plastic material and serve for containing admixable nutritional supplements, pH-sticks or medicinal additives. Moreover, the mixing element 3 can also be accommodated in one of the auxiliary containers 14, 15, 16, so that it first needs to be introduced into the container interior space 8 during the mixing process, and thus does not slide back and forth obtrusively in the mixing liquid or does not beat against the walls during mobile activities.

For closing the container part 1, as the lid element 2 a screwable drinking closure is provided, which comprises an internal thread, which is screwable with the first external thread 12 of the mixing or drinking bottle in a fluid-tight manner. In order that the drinking liquid that has been mixed with a nutritional supplement or the like can be drunk immediately after the mixing process, the drinking closure 2 additionally includes a drinking spout 17 which is connected through an opening with the interior space of the drinking bottle. For sealing during the mobile activities and during the mixing process, a pivotable closure bail 18 is still additionally arranged on the drinking closure 2, and includes a bale-shaped closure body 19 that is adapted, with respect to the cross-section, to the opening of the drinking spout 17, and closes it in a form-fitting and frictional force-transmitting manner through a frictional connection.

For mixing a drinking liquid preferably with a powder-form nutritional supplement, the illustrated mixing element 3 is insertable within the mixing or drinking container. This mixing element 3 consists of a wound wire coil 20, preferably of a round metal wire with a diameter of 1 to 3 mm.

The mixing element of a continuous wire coil 20 is shown individually and in greater detail in FIG. 2 of the drawing. In that regard, this mixing element 3 consists of two flat spaced-apart snail-shaped spiral parts 4, 5, of which the outer diameter is adapted to the inner diameter of the drinking vessel 1 as the container part. In that regard, the outer diameter of the two spaced-apart snail-spirals 4, 5 is approximately 0.1 to 1 mm smaller than the inner diameter of the drinking vessel 1, so that thereby a sliding gap 7 is formed. For connecting the two snail-shaped spiral parts 4, 5, the screw-shaped spiral part 6 is arranged in the center of the mixing element 3, wherein the diameter of the screw-shaped spiral part 6 comprises approximately ⅕ to ⅓ of that of the outer diameter of the snail-spirals 4, 5.

The mixing element 3 wound of the wire coil 20 preferably consists of corrosion-resistant stainless steel or a comparable material. From the wound steel wire there arises a mixing element 3 that is rigid or comprises a small elasticity, through which the outer shape is slightly elastically changeable, only during the shaking process for the mixing. Such a mixing element 3 can also consist of three or more snail-shaped spiral parts 4, 5, which are connected with one another through several central screw-shaped spiral parts 6. As the wire, preferably a round wire is provided, whereby the one-piece mixing element 3 can also consist of a many-edged or polygonal wire, through which preferably the interior surfaces of the drinking vessel 1 can better be cleaned by its edges, of adhering powder residues for a more uniform mixing. Because the screw-shaped spiral parts 4, 5 simultaneously carry out a sieve function during the mixing, their radial wire spacing distances are preferably 1 to 10 mm, and leave a central passage 23 of approximately 5 to 30 mm diameter in the center 22.

In FIG. 3 of the drawing a further embodiment of the mixing element 3 is illustrated, in which the two spaced-apart snail-shaped spiral parts 4, 5 are axially connected by an outer coaxial screw-shaped spiral part 6. In that regard, this mixing element 3 is similarly embodied as a one-piece wire coil 20, in which the two axially spaced-apart snail-shaped spiral parts 4, 5 end in the center 22 and are wound out from there, so that the central passage 23 thereof is generally smaller relative to the mixing element 3 according to FIG. 2. Thereby, the mixing effect that is preferably produced by the snail-shaped spiral parts 4, 5, can be easily improved. Because the snail-shaped spiral parts 4, 5 function as a sieve, the radial spacing distances 21 thereof relative to one another are adaptable to the substances to be mixed. With the provided powder-form nutritional supplements, the radial spacing distances 21 between the individual snail courses are ideally only 3 to 5 mm, in order to avoid adhesions and to achieve a good mixing effect. The axial spacing distances between the screw-shaped courses are preferably 5 to 15 mm. In the mixing element according to FIG. 3, both the outer diameter of the snail-shaped spiral parts 4, 5 as well as the outer diameter of the screw-shaped spiral part 6 are the same size and adapted to the inner diameter with respect to a sliding gap 7. In typical drinking bottles in that regard, an outer diameter of approximately 50 to 100 mm is provided, whereby for drinking bottle heights of approximately 150 to 200 mm the mixing elements 3 preferably comprise a height of approximately 50 to approximately 100 mm.

In a particular embodiment of the mixing element 3 according to FIG. 2 of the drawing, a hollow body 9 of plastic material, which is illustrated in further detail in FIG. 4 of the drawing, is additionally fixed in the center 22 within the screw-shaped spiral part 6. In that regard, the hollow body 9 is embodied cylinder-shaped, of which the outer diameter is adapted to the inner diameter of the screw-shaped spiral part 6, and is also fixed thereon by a frictional connection. Furthermore, the hollow body 9 includes two cover elements 24 of which the diameter is preferably enlarged by the wire diameter relative to the outer diameter of the cylinder part 25. In that regard preferably one of the cover elements 24 is embodied as a screw part with an external thread, which is tightly screwable into the internal thread of the hollow body 9. Therefore the hollow body 9 is slidable into the central passage 23 of the screw-shaped spiral part 6 in a simple way and manner, and tightly fixable therein by screwing-on a cover element 24.

This hollow body 9 is preferably fabricated of an easily producible plastic material, but can also be produced of metal or ceramic. The interior space of the hollow body 9 is preferably closeable in a moisture-tight manner by at least one of the cover elements 24, so that a cooling medium or also additional weight parts are insertable therein.

The embodiment of this hollow body 9 is shown individually in greater detail in FIG. 5 of the drawing. In this embodiment, the bottom cover element 24 is fixedly connected with the cylinder-shaped hollow body 9, while the upper cover element 24 includes a threaded closure and is thereby releasable. In a particular embodiment of this hollow body 9, through-flow openings can be introduced both in the cover element 24 as well as also in the cylinder part 25, through which openings the drinking liquid can penetrate into the interior space. In such an embodiment, it is provided that pH-sticks are introduced into the interior space of the hollow body 9, through which the pH-value of the drinking liquid can be changed. In such an embodiment it is also conceivable to introduce medicinal additives into the interior space of the cylinder part 25, which are dissolvable in the drinking liquid and which are to be consumed together therewith.

A simplified alternative embodiment of a mixing element 3 is shown in greater detail in FIG. 6 of the drawing. In that regard, the mixing element 3 consists simply of two axially spaced snail-shaped spiral parts 4, 5, which are axially connected with one another only by the central hollow body 9. In that regard, both the snail-shaped spiral parts 4, 5 as well as the hollow body 9 arranged therebetween are embodied as this was already described regarding the mixing elements 3 of FIGS. 2 to 5. However, in this regard, after the unscrewing of one cover element 24, the snail-shaped spiral parts 4, 5 are pushed onto the cylinder part 25 of the hollow body 9, and in the area of the central passage 23 are fixed on the cylinder part 25 through a clamping force therewith. For an improved hold, grooves can be applied on the outer surface of the cylinder part 25, which are snapped into the inner wire coils 20 of the snail-shaped spiral parts 4, 5. Thereby it is simultaneously possible to secure more than only two snail-shaped spiral parts 4, 5 on the cylinder part 25, in order to improve the sieve effect and the guidance within the container interior space 8. Through such a hollow body 9 it is also possible to adapt the length of the mixing elements 3 to the respective cylindrical containers 1 in a simple manner. For it is advantageous in practice, for various purposes also to provide variously sized cylindrical containers 1, that can vary preferably only in their length. Thus, thereupon various different cylinder parts 25 are provided, which differ from one another only in their length, and thereby the mixing elements 3 are adapted to the respective cylindrical containers 1 depending on the length.

For mixing a liquid preferably with a powder-form substance, first these are filled one after another into the container interior space 8. Before or after this, then the mixing element 3 is axially slidingly introduced into the container interior space 8, in that it sinks downwardly due to its own self-weight. Thereupon the container 1 is closed in a liquid-type manner by a lid element 2 or a drinking closure. For mixing, then the entire mixing container is shaken preferably in an axial direction, so that the mixing element 3 due to its own self-weight and the shaking motion moves or slides within the interior space 8 of the container 1 axially from the floor or base surface 10 up to the lid element 2 and back again. Thereby, already during a single back and forth shaking process, the entire liquid quantity with the substance to be mixed flows through the two or more snail-shaped spiral parts 4, 5 which function as a sieve. Thereby in a simple manner, the clumps formed in the liquid become dissolved, and also the adhesions on the side walls and in the floor and lid area are dissolved and uniformly mixed with the liquid. Therefore, through only a few shaking motions, good mixing results are achievable, and simultaneously also adhesions on the inner side walls as well as also in the floor and lid area are removed by a beating or contacting of the mixing element 3.

Because such snail-shaped and screw-shaped spiral parts are economically producible by a simple winding process, such mixing elements 3 are not only for producing drinking liquids but also for mixing color pigments or other chemical substances in corresponding mixing containers also after a settling process at any time can again be mixed with one another to form a uniform dispersion.

The invention claimed is:

1. A mixing container assembly, comprising an internally cylindrical container (1) that is closeable at an upper opening, a lid element (2) adapted to close the internally cylindrical container (1), and an internally axially movably arranged mixing element (3), characterized in that the mixing element (3) includes at least two planar, snail-shaped spiral parts (4, 5) and a hollow body (9) arranged axially therebetween, wherein the planar, snail-shaped spiral parts (4, 5) consist of a wire coil (20), and the outer diameter of the planar, snail-shaped spiral parts (4, 5) is adapted to the inner diameter of the container (1) while maintaining a small sliding gap (7) such that the mixing element (3) is guided throughout axial movement by the cylindrical container interior, wherein the mixing element (3) comprises an axial length of at least ¼ to at most ⅔ of the container length (8) and further comprises at least one central helical, screw-shaped spiral part (6) arranged axially between the at least two planar, snail-shaped spiral parts (4,5), characterized in that the outer diameter of the hollow body (9) corresponds to the inner diameter of the helical, screw-shaped spiral part or parts (6) and the hollow body (9) includes a closeable cylinder part (25) and two cover elements (24), of which the outer diameter is larger than the inner diameter of the helical, screw-shaped spiral part or parts (6), and wherein further at least one of the two cover elements (24) is screwable with the closeable cylinder part (25).

2. The mixing container assembly according to claim 1, characterized in that the cylinder part (25) includes several through-flow openings for in-flow and out-flow of a mixing liquid.

3. The mixing container assembly according to claim 1, characterized in that the hollow body (9) is formed of a synthetic plastic or metal material.

4. The mixing container assembly according to claim 1, characterized in that it is embodied as a drinking bottle, wherein the cylindrical container (1) comprises a first external thread (12) that is tightly screwable with an inner thread of the lid element (2) and the lid element (2) has a drinking closure that further comprises a drinking spout (17), which is connected with the container length(8) through a round opening, and a pivotable closure bail (18) having a closure body (19) adapted to frictionally fit within the drinking spout (17), with which the drinking spout (17) is closeable and openable.

5. The mixing container assembly according to claim 1, characterized in that the mixing element (3) comprises two of the planar, snail-shaped spiral parts (4, 5), which each have an outer diameter that is approximately 0.1 mm to 1 mm smaller than the inner diameter of the container, and the helical, screw-shaped spiral part or parts (6) arranged axially therebetween, which has an outer diameter of approximately ⅕ to ⅓ of the outer diameter of the two planar, snail-shaped spiral parts (4, 5).

6. The mixing container assembly according to claim 1, characterized in that the mixing element (3) comprises a one-piece wound wire coil (20) having a cross-section that is round or angular/cornered.

* * * * *